US011265333B2

United States Patent
Yu et al.

(10) Patent No.: US 11,265,333 B2
(45) Date of Patent: Mar. 1, 2022

(54) METHOD OF ACHIEVING SYNCHRONIZATION MANAGEMENT OF ACCOUNT INFORMATION OF WEB INTERFACE IN MULTI-SYSTEM DAS

(71) Applicant: SUNWAVE COMMUNICATIONS CO., LTD., Zhejiang (CN)

(72) Inventors: Wangliang Yu, Zhejiang (CN); Bangxiang Ling, Zhejiang (CN); Yaxue Xu, Zhejiang (CN)

(73) Assignee: SUNWAVE COMMUNICATIONS CO., LTD., Zhejiang (CN)

( * ) Notice: Subject to any disclaimer, the term of this patent is extended or adjusted under 35 U.S.C. 154(b) by 0 days.

(21) Appl. No.: 16/960,028

(22) PCT Filed: Mar. 29, 2019

(86) PCT No.: PCT/CN2019/080327
§ 371 (c)(1),
(2) Date: Jul. 3, 2020

(87) PCT Pub. No.: WO2019/196675
PCT Pub. Date: Oct. 17, 2019

(65) Prior Publication Data
US 2021/0058406 A1  Feb. 25, 2021

(30) Foreign Application Priority Data
Apr. 13, 2018  (CN) .......................... 201810328923.8

(51) Int. Cl.
*H04L 29/06* (2006.01)
*H04B 7/02* (2018.01)
(Continued)

(52) U.S. Cl.
CPC .............. *H04L 63/12* (2013.01); *H04B 7/02* (2013.01); *H04L 63/083* (2013.01);
(Continued)

(58) Field of Classification Search
CPC ... H04L 63/12; H04L 63/083; H04L 63/0876; H04L 67/02; H04L 67/06; H04L 67/1095;
(Continued)

(56) References Cited

U.S. PATENT DOCUMENTS 10,630,410 B2 * 4/2020 Parkvall ................ H04L 5/0053
2011/0231280 A1   9/2011 Farah
(Continued)

FOREIGN PATENT DOCUMENTS

| CN | 101355527 A | 1/2009 |
|----|-------------|--------|
| CN | 101727459 A | 6/2010 |

(Continued)

OTHER PUBLICATIONS

Sakthi Saravanakumar P et al. "Heterogeneous synchronization layer for web services". 16th International Conference on Advanced Communication Technology. Jul. 28, 2014 (Jul. 28, 2014). pp. 1280-1283.
(Continued)

*Primary Examiner* — Chirag R Patel
(74) *Attorney, Agent, or Firm* — Gang Yu

(57) ABSTRACT

A method of achieving synchronization management of account information of a World Wide Web (WEB) interface in a multi-system Distributed Antenna System (DAS) is provided, including: a security verification initialization of the WEB interface when a single system device in the multi-system DAS is started, a current user information synchronization of a WEB interface between systems in the multi-system DAS, and a key book synchronization of WEB account information between the systems in the multi-system DAS. With the adoption of the method, synchronization management of the account information of the WEB interface in the multi-system DAS may be achieved, so that a management mode is simplified, and management effi-
(Continued)

ciency is improved, information of a current WEB user is synchronized, integration of WEB user statuses and automatic login of multiple systems are achieved.

4 Claims, 8 Drawing Sheets

(51) Int. Cl.
  *H04L 67/02* (2022.01)
  *H04L 67/06* (2022.01)
  *H04L 67/1095* (2022.01)
  *H04L 69/16* (2022.01)
(52) U.S. Cl.
  CPC .......... *H04L 63/0876* (2013.01); *H04L 67/02* (2013.01); *H04L 67/06* (2013.01); *H04L 67/1095* (2013.01); *H04L 69/16* (2013.01)
(58) Field of Classification Search
  CPC ..... H04L 69/16; H04L 1/0061; H04L 1/0083; H04L 1/203; H04L 1/0072; H04L 1/0079; H04L 25/03866; H04L 9/3236; H04B 7/02; H04B 1/7115; H04B 7/022; H04B 7/04; H04B 7/024; H04W 84/12; H04W 28/04; H04W 84/20; H04W 28/0205; H03M 13/09; H03M 13/19; H03M 13/1575; G08C 17/02
  See application file for complete search history.

(56) References Cited

U.S. PATENT DOCUMENTS

| 2012/0057457 | A1 | 3/2012 | Ahmadi | |
|---|---|---|---|---|
| 2014/0012922 | A1 | 1/2014 | Wu | |
| 2017/0181054 | A1* | 6/2017 | DeCerbo, Jr. | ......... G06F 3/0484 |
| 2018/0160304 | A1* | 6/2018 | Liu | ........................ H01P 3/16 |

FOREIGN PATENT DOCUMENTS

| CN | 102098794 A | 6/2011 |
|---|---|---|
| CN | 103309772 A | 9/2013 |
| CN | 105656589 A | 6/2016 |
| CN | 105704650 A | 6/2016 |
| CN | 106060066 A | 10/2016 |
| CN | 108667809 A | 10/2018 |

OTHER PUBLICATIONS

Wang, Chenzhi. "Research on the Design of the Player End of the Media Delivery System Based on Distributed Wireless Technology". Chinese Master's Thesis Full-text Database, Information Science and Technology. Mar. 31, 2013 (Mar. 31, 2013). pp. 136-934.
Kyran Dale et al. "Data Visualization with Python and JavaScript". Aug. 22, 2017 (Aug. 22, 2017). pp. 297-301.
First examination report of corresponding JP application dated Sep. 14, 2021 re: Application No. 2020-538850, pp. 1-3.
First search report of corresponding EP application dated Aug. 19, 2021 re: Application No. 19785544.8.

* cited by examiner

METHOD OF ACHIEVING SYNCHRONIZATION MANAGEMENT OF ACCOUNT INFORMATION OF WEB INTERFACE IN MULTI-SYSTEM DAS

CROSS-REFERENCE TO RELATED APPLICATIONS

The present disclosure claims priority of Chinese Patent Application No. 201810328923.8, filed to China Patent Office on Apr. 13, 2018. Contents of the present disclosure are hereby incorporated by reference in entirety of the Chinese Patent Application.

TECHNICAL FIELD

The present disclosure relates to the technical field of World Wide Web (WEB) technologies and embedded application software of a Distributed Antenna System (DAS), and mainly to a method of achieving synchronization management of account information of a World Wide Web (WEB) interface in a multi-system DAS.

BACKGROUND

A Distributed Antenna System (DAS) is a network consisting of multiple antennas distributed inside a building and specially configured to provide wireless indoor coverage. The DAS may include an active system and a passive system.

A World Wide Web (WEB) refers to a global wide area network, and the WEB is a global, dynamically interactive and cross-platform distributed graphic information system based on hypertext and a Hyper Text Transfer Protocol (HTTP). The WEB is a network service established on the Internet, and provides a visitor with a graphical and accessible intuitive interface to find and browse information on the Internet. A file and a hyperlink may organize information nodes on the Internet into a mesh structure in which the information nodes are related to each other.

Account information refers to an account name, an account password, an account online status and the like, and common operations of the account information may include: login, logout, account addition, account deletion, modification of the password and the account name, and the like.

Synchronization refers to that at least two quantities changing with time maintain a certain relative relationship in a changing process, events occurring in a system are coordinated, and consistency and unification occur in time. The synchronization implemented in the system is also known as "in time" and "synchronous, in sync".

A BOA server is a small and high-efficiency web server and an http server operating under a unix or linux environment, compatible with a Common Gateway Interface (CGI) and configured for a single task of an embedded system, with an open source code and high performance.

Asynchronous Javascript And XML (AJAX), namely, asynchronous JavaScript and Extensive Markup Language (XML), is a webpage development technology of creating an interactive webpage application. The AJAX is used for creating a rapid dynamic webpage and able to update part of the webpage under a situation that the whole webpage does not need to be loaded again. Through a small amount of data exchange with the server in the background, AJAX may make the webpage achieve asynchronous update. It means that some part of the webpage may be updated under a situation that the whole webpage does not need to be loaded again.

A Common Gateway Interface (CGI) is an interface standard between an external application program (a CGI program) and the web server, and is a process of transmitting information between the CGI program and the Web server. According to CGI specification, the Web server implements the external programs and outputs to a web browser. The CGI transforms a group of simple static hypermedia files of the Web into a complete and new interactive media. The CGI may be written in any language, including C, C++, VB, Delphi and other languages, as long as the language has standard input, output and environment variables.

Embedded software refers to an operating system and development tool software embedded into hardware. The embedded software is software based on design of an embedded system. The embedded software is also one kind of computer software and consists of programs and files of the programs. The embedded software may be subdivided into three categories: system software, support software and application software and is an important part of the embedded system.

A File Transfer Protocol (FTP) is configured to implement a two-way transmission of a control file on the Internet, and is a client/server system. A user may connect with an FTP server program on a remote host through a client program compatible with an FTP protocol. The user sends a command to the server program through the client program, and the server program implements the command sent by the user and returns a result of implementation to the client. For example, the user sends one command, to request the server to transfer a copy of a certain file to the user. The server may respond to the command and send a specified file to a machine of the user. The client program may receive the file on behalf of the user and store this file in a directory of the user.

The management of the WEB interface of the DAS is used in a single system at present. While the WEB of the DAS consisting of multiple systems often needs independent management of each single system, with low efficiency, cumbersome operation, and confused authority. Therefore, a method of synchronous management of account information in of a WEB interface in a multi-systems DAS is in urgent need.

SUMMARY

At least some embodiments of the present disclosure provide a method of achieving synchronization management of account information of a WEB interface in a multi-system DAS, so as at least to partially solve above-mentioned problem in the related art.

In an embodiment of the present disclosure, a synchronization management of the account information of the WEB interface in the multi-system DAS is provided. The synchronization management of the account information of the WEB interface in the multi-system DAS may include: a front-end interface system of WEB, a Common Gateway Interface (CGI) data request transfer system and an embedded application program synchronization system.

The front-end interface system of the WEB includes a browser, a webpage file program and a BOA server.

The front-end interface system is compatible with at least one mainstream browser. The browser parses a Hypertext Markup Language (HTML) file, an Extensive Markup Language (XML) file, a Cascading Style Sheet (CSS) file and other files, displays the WEB interface to a user and provides an operating interface, and dynamically parses and calls a JavaScript program to respond to an operation of the user.

The Webpage file program includes the HTML file, the CSS file, the XML file, the JavaScript program and the like. The HTML file describes a user login window, a user exit button, a user management interface and other elements, and cites most files and programs required by the front end of the WEB. The XML file describes at least one engineering parameter and the like of a WEB system of the DAS. The CSS file stipulates a display style of the WEB interface. The JavaScript program dynamically responds to the operation of the WEB Interface, including submission of a login status query, obtaining of a user name and a password when clicking and logging in, a pop-up window during user management, obtaining of input of a sheet, submission of a GET/POST request and obtaining of returned information, setting of host-slave signs of the system, and 5-second timing to reset a query event.

The BOA server provides the browser with the above-mentioned webpage file program, responds to a request of the browser to return, calls a CGI routine, and the like.

The CGI data request transfer system includes: the CGI routine and a CGI server program.

The CGI routine is a CGI program called when the BOA server responds to a request of the WEB, with functions of obtaining environment variable request data, implementing standard output of a reply data request, parsing a data command, a reorganization data command and User Datagram Protocol (UDP) forwarding data, acting as a transfer service routine between a WEB server and a background CGI server program, parsing verification of a user password, account addition, account deletion, a password modification command, modification and query of a key book, connection to a data link for verification and the like.

The CGI server program, as a background operating program after starting, receives a CGI routine data package, parsing a command, reorganizing a mobile protocol data package, parses a mobile protocol package, and acting as a data link transfer station between a front-end system and an underlying system.

The embedded application program synchronization system includes a host system service program, a slave system service program and a File Transfer Protocol (FTP) system.

The host system service program receives and parses mobile protocol data sent by the CGI server program, updates login and logout statuses of a local user and a login user name, calculates CRC16 verification of the key book, receives a heartbeat package of each slave system, integrates the login and logout statuses and the login user name of the each system, broadcasts and issues login and logout information, the login user name and CRC16 verification of the key book based on the UDP, and resets the login status after 5 min.

The slave system service program receives and parses the mobile protocol data sent by the CGI server program, reports the login and logout statuses and the login user name of the local user, updates the login and logout statuses and the login user name of the local user according to a broadcast package of the host system and a data package of the CGI server program, calculates CRC16 verification of a local key book and compares the CRC16 verification of the local key book with CRC16 verification of a broadcast key book of a host system, and determines whether to start an FTP download routine.

As to FTP system, an FTP server is configured in the host system to provide a key file download service; an Application Programmers Interface (API) of an FTP client is configured inside a slave server program to download a key book file in the FTP server of the host system.

The at least some embodiments of the present disclosure achieves management and synchronization of the account information of the WEB interface of the multi-system DAS through the front-end interface system of the WEB, the CGI data request transfer system and the embedded application program synchronization system, and the method of achieving synchronization management of account information on the WEB interface in the multi-system DAS may include: a security verification initialization of the WEB interface when a single system device in the multi-system DAS is started, a password verification and logout submission synchronization sign of the WEB interface of the single system device in the multi-system DAS, synchronization of the login and logout status and the user name of the WEB interface between the systems in the multi-system DAS and a key book synchronization of the WEB account information between the systems in the multi-system DAS.

For the security verification initialization of the WEB interface when the single system device in the multi-system DAS is started, a password of an empty account is submitted by directly using an AJAX-GET method when the single system device is started to achieve the initialization of the WEB interface. A verification process may include: a homepage code request, a login window code request, automatic verification of the password of the empty account, a control right of the login window and triggering of a clicking event.

For the current user information synchronization of the WEB interface between the systems in the multi-system DAS, synchronization of the login and logout information between the multiple systems is achieved through synchronizing status information of WEB user in the single system to an embedded application program and master-slave communication of an embedded application program between the multiple systems. A synchronization process may include: synchronization of an account password verification request in the single system, a logout request and a login status to the embedded application program, reporting of a local login status based on a heartbeat of a slave system, integration of the statuses of the systems by a host system, sending of the UDP broadcast package, and modification of the local status by the slave system.

The key book synchronization of the WEB account information between the systems in the multi-system DAS is achieved through implementing unified management of the account information by using the host system in the multiple systems and managing the slave system with broadcast packages and downloading and updating the key book based on the FTP. A synchronization process may include: a host account management operation, broadcasting, by the host system, a Cyclical Redundancy Check (CRC) 16 verification code of the key book, and comparing, by the slave system, the CRC16 verification code with a local verification code to determine whether to download a latest key book from the host system based on the FTP.

The beneficial effects of the at least some embodiments of the present disclosure are as follows. The management of the WEB account information of the multi-system DAS is achieved through the whole set of system. The synchronization of the user status information is achieved by combining submission of the login and logout signs and the user name to the embedded application program with communication between the host and slave systems, unified management of the host system is achieved by account management authority, comparison of the CRC16 verification of the key book and automatic download of the FTP. In this way, a malicious operation is avoided, automatic login and timeout login of the WEB interface are achieved by inquiring the embedded software once every 5 seconds upon clicking the webpage and implementing 5 min login resetting, and the unified synchronization management of the multiple systems may be achieved without an individual operation of the each system.

DETAILED DESCRIPTION

The present disclosure will be introduced below in detail in combination with drawings.

Synchronization management of account information of a World Wide Web (WEB) interface in a multi-system Distributed Antenna System (DAS) may include: a front-end interface system of the WEB, a Common Gateway Interface (CGI) data request transfer system and an embedded application software synchronization system.

Figure 1:
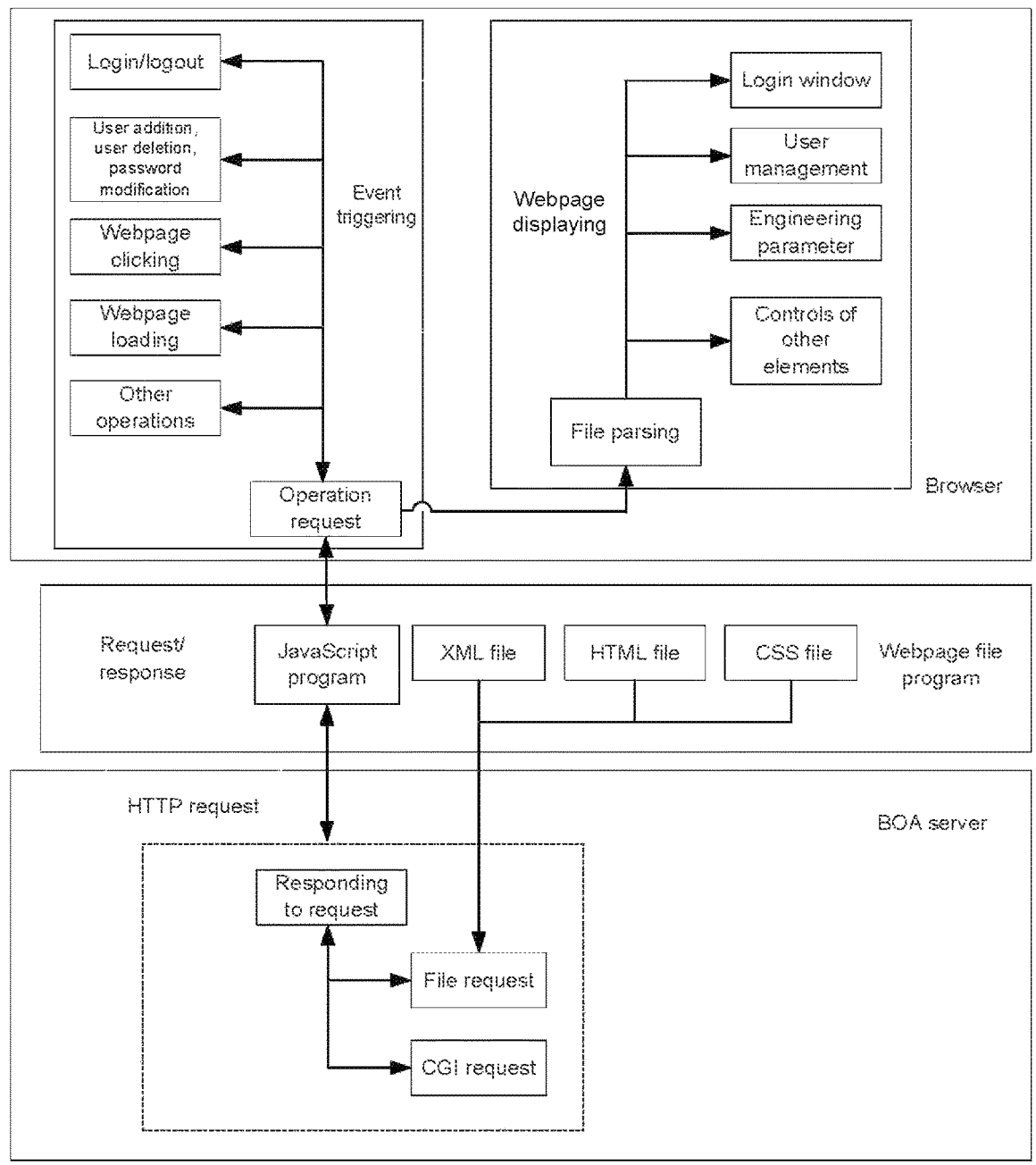
FIG. 1 is a structural diagram of a front-end interface system of the World Wide Web (WEB) according to an optional embodiment of present disclosure.

A structural diagram of the front-end interface system of the WEB is shown in FIG. 1, and the front-end interface system of the WEB includes a browser, a webpage file program and a BOA server.

The browser may include: file parsing and a user operation.

A Hypertext Markup Language (HTML) file, an Extensive Markup Language (XML) file, a Cascading Style Sheet (CSS) file and the like are parsed, and contents after parsing may be displayed in a window. A login window displays related contents, including user management, an engineering parameter and controls of other elements.

The user operation may include: login, logout, the user management, other setting, webpage clicking, as to provide a user with an operating space.

The webpage file program may mainly include: a HTML file, a CSS file, an XML file and a JavaScript program.

The HTML file describes a user login window, a user exit button, a user management interface and other elements, and cites most files and programs required by the front end of the WEB.

The XML file describes at least one engineering parameter and the like of a WEB system of the DAS.

The CSS file stipulates a display style of a WEB interface.

The JavaScript program dynamically responds to an operation of the WEB interface, including submission of a query of a login status, obtaining of a user name and a password when clicking and logging in, a pop-up window during user management, obtaining of input of a sheet, submission of a GET/POST request and obtaining of returned information, setting of a master-slave sign of the system, 5-second timing to reset a query event, and the like.

The BOA server provides the browser with the above-mentioned webpage file program, responds to the request of the browser to return, calls a CGI routine and the like.

Figure 2:
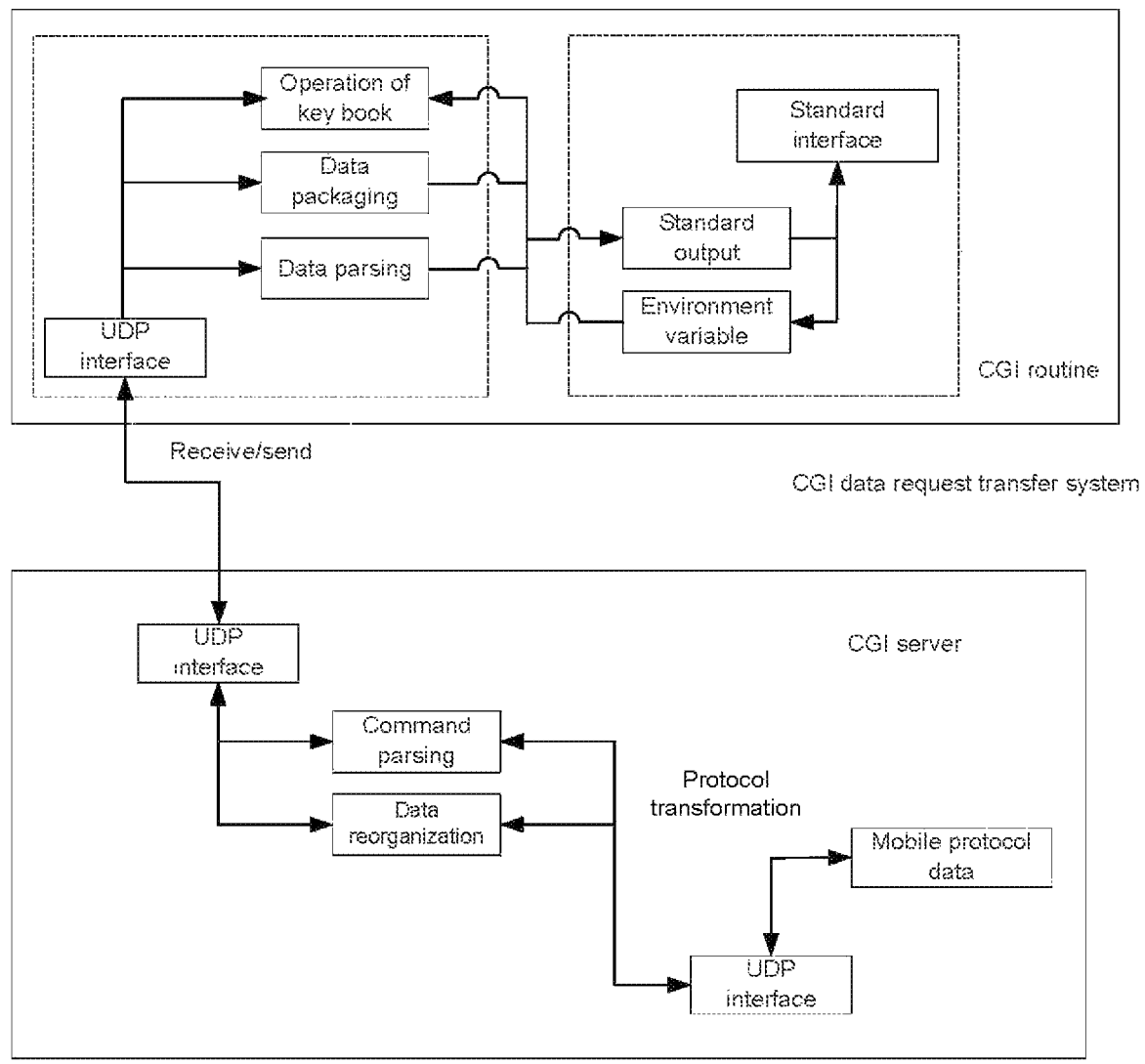
FIG. 2 is a structural diagram of a Common Gateway Interface (CGI) data request transfer system according to an optional embodiment of present disclosure.

A structural diagram of the CGI data request transfer system is shown in FIG. 2, and the CGI data request transfer system includes: the CGI routine and a CGI server program.

The CGI routine may include: parsing and reply of a WEB request, and management of a key book.

A function of parsing and replying the WEB request refers to obtaining of environment variable request data, standard output of a reply data request, parsing of a data command, a reorganization data command and User Datagram Protocol (UDP) forwarding data, and a role of a transfer service routine between a WEB server and a background CGI server program.

The management of the key book may specifically refer to parsing of verification of a user password, account addition, account deletion, password modification command, and modification and query of a key book.

The CGI server program, as a background operating program upon starting, receives a CGI routine package and a parsing command, reorganizes a mobile protocol package, parses a mobile protocol package, and acts as a data link transfer station between a front-end system and an embedded application program of an underlying system.

Figure 3:
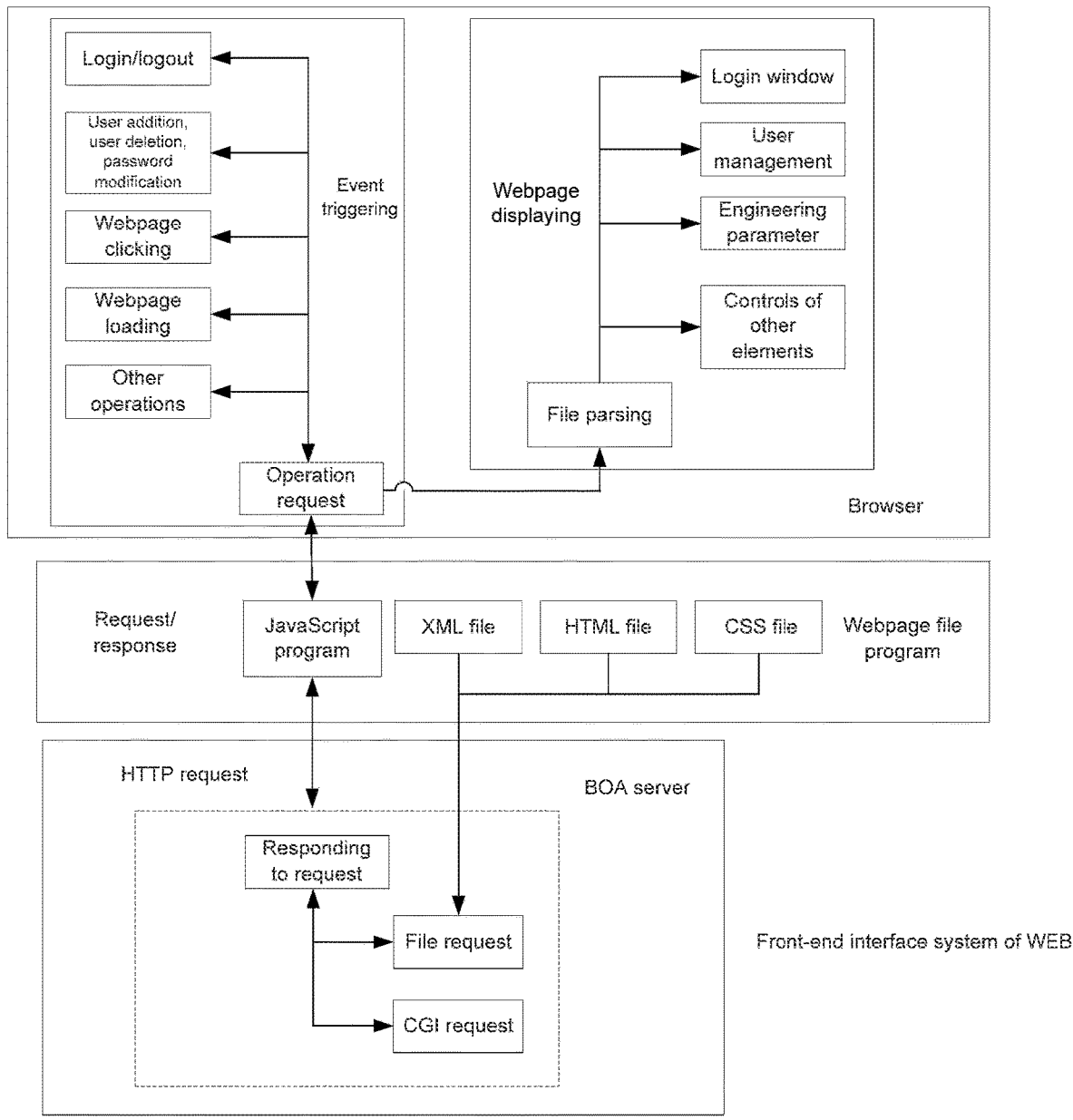
FIG. 3 is a structural diagram of an embedded application program synchronization system according to an optional embodiment of present disclosure.

A structural diagram of an embedded application program synchronization system is shown in FIG. 3, and the synchronization system includes: a host system service program, a slave system service program and a File Transfer Protocol (FTP) system.

Functions of the host system service program may include: management of a local WEB user and synchronization management of a system user.

The management of the local WEB user is to receive and parse mobile protocol data sent by the CGI server program, provide and update login and logout statuses and login user name of the local user, calculate CRC16 verification of the key book, and reset the login status within 5 min.

The synchronization management of the system user is to receive a heartbeat package of each slave system and integrate the login and logout statuses and the login user name of the each system, broadcast and issue login and logout statuses and the login user name of the system with the UDP, and implement CRC16 verification of the key book.

Functions of the slave system service program may include: management of the local WEB user and synchronization of the system user identical with those of a host system.

The synchronization of the system user is to report the login and logout statuses and the login user name of the local user, update the login and logout statuses and the login user name of the local user according to a broadcast data package of the host system, calculate CRC16 verification of a local key book and compare the CRC16 verification of the local key book with the CRC16 verification of a broadcast key book of the host system, and determine whether to start an FTP download routine.

The FTP system may include: an FPT server and an Application Programmers Interface (API) interface of an FTP client.

The FPT server is configured on the host system, for providing a service of downloading a key book file.

The API interface of the FTP client is configured inside the slave service program, for downloading the key book file in the FPT server of the host system.

In an optional embodiment of the present disclosure, a password of an empty account is submitted by directly using an Asynchronous Javascript And XML (AJAX)-GET method when the system is started, so as to achieve initialization of the WEB interface. And a verification process may include: a homepage code request, a login window code request, automatic verification of the password of the empty account, a control right of the login window and triggering of a clicking event. The following steps may be included.

Figure 4:
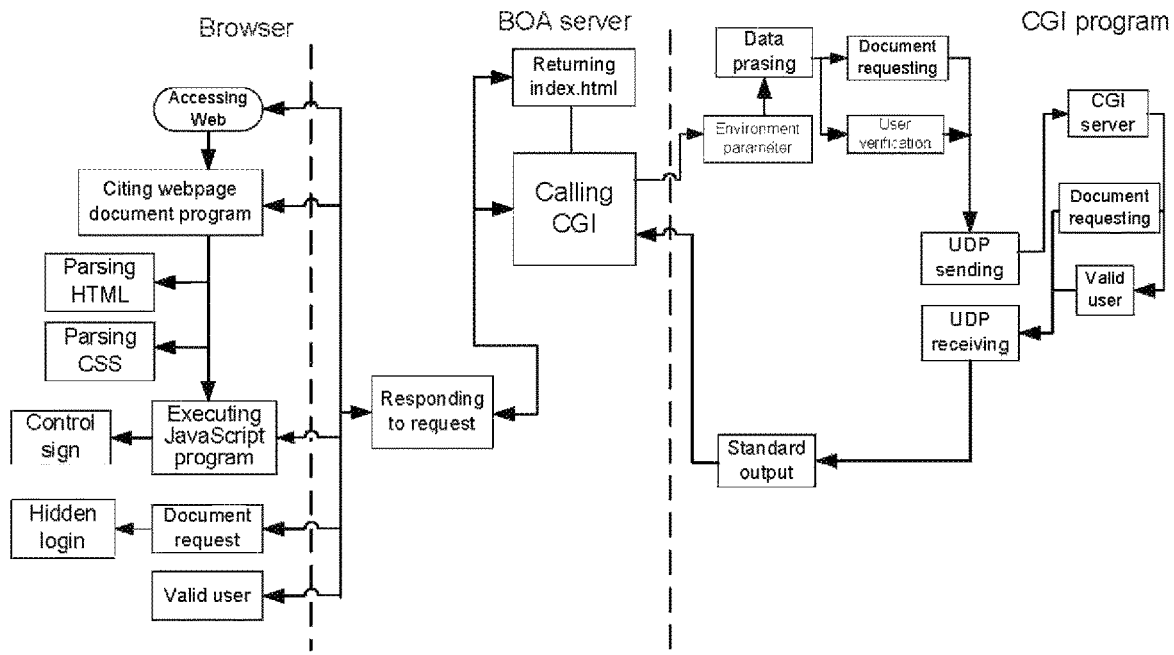
FIG. 4 is a flowchart of initialization of a homepage according to an optional embodiment of present disclosure.

At Step 1, a homepage is initialized, as shown in FIG. 4.

At Step 101, the browser requests a homepage file when accessing to a WEB homepage.

At Step 102, the BOA server responds to a corresponding request.

At Step 103, the browser parses the homepage file and a cited file of this homepage file, and a program display homepage.

At Step 104, the JavaScript program calls the AJAX-GET method to request the CGI to verify an account password and a relevant webpage file.

At Step 105, the BOA server responds to call the CGI routine.

At Step 106, the CGI routine sends protocol data to the CGI server program.

At Step 107, the CGI server program reads an XML file of the homepage and an HTML file of the login window.

At Step 108, a CGI server verifies a password of a failed empty account.

At Step 109, the CGI server returns the verified data to the CGI routine.

At Step 110, the CGI routine uses a standard output to return contents in response to a WEB request.

Figure 5:
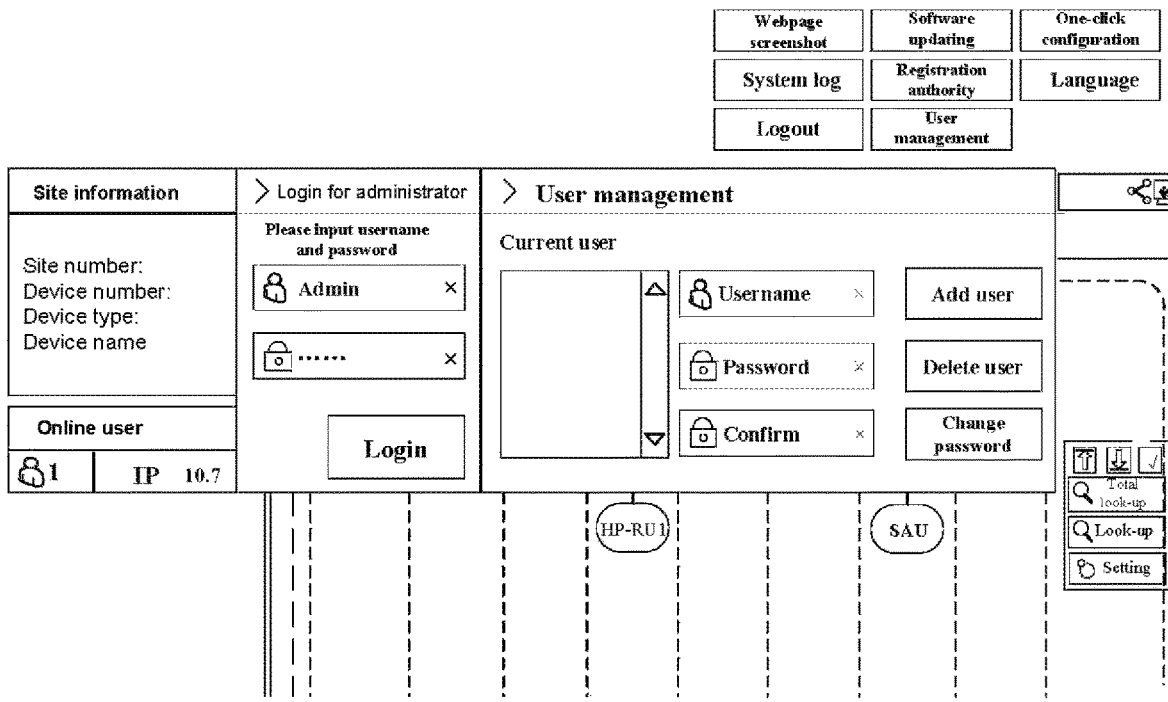
FIG. 5 is a display diagram of a homepage according to an optional embodiment of present disclosure.

At Step 111, the JavaScript program receives the request, and returns and parses the webpage file, as shown in FIG. 5.

At Step 2, automatic verification of a user login sign fails.

At Step 201, a WEB program fails to receive a verification return sign.

At Step 202, the login window is hidden, and a control sign is modified.

At Step 203, display and closing management of a logout window is handed over to the embedded application program for control.

Figure 6:
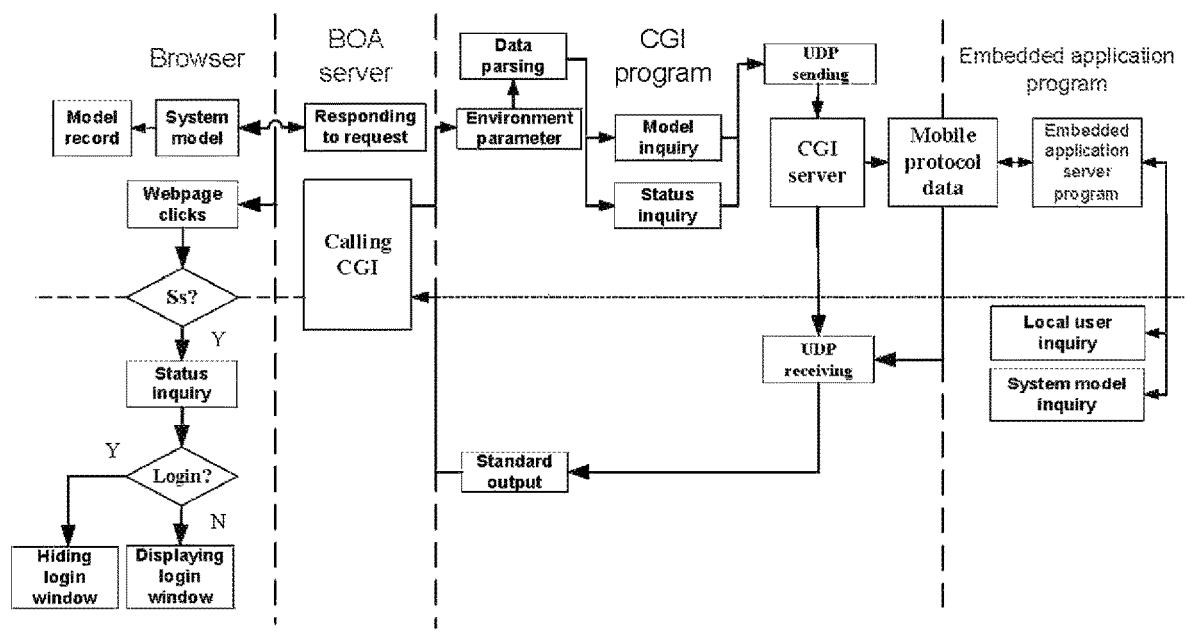
FIG. 6 is a control flowchart of a login window according to an optional embodiment of present disclosure.

At Step 3, the login window is controlled, as shown in FIG. 6.

At Step 301, the CGI is requested to inquire the login sign and a system model in case of any clicking event.

At Step 302, the CGI server program sends query protocol data to the embedded application program.

At Step 303, the embedded software returns a local record status.

At Step 304, when the JavaScript program receives a request response indicating that login has been implemented, the login window will not be displayed, when the JavaScript program receives the request response indicating that login has not been implemented, the login window will be displayed. Other operations are prohibited, and a master-slave system sign is recorded at the same time.

At Step 305, a 5-second one-time clicking event is set to submit an AJAX-GET request, and a query step may be repeated by clicking again after 5 seconds.

Traditional user management of the WEB interface generally records and clears the login status through cookies and other browsers, and the WEB program controls display of the login window. The beneficial effects of this embodiment of the present disclosure are as follows. A record value of the underlying server program of the system is inquired directly by clicking the webpage, so as to implement automatic login and logout, an operating process is hidden, and the underlying service program of the system controls the login window, thereby providing a foundation for the automatic login of multiple systems in the method.

Figure 7:
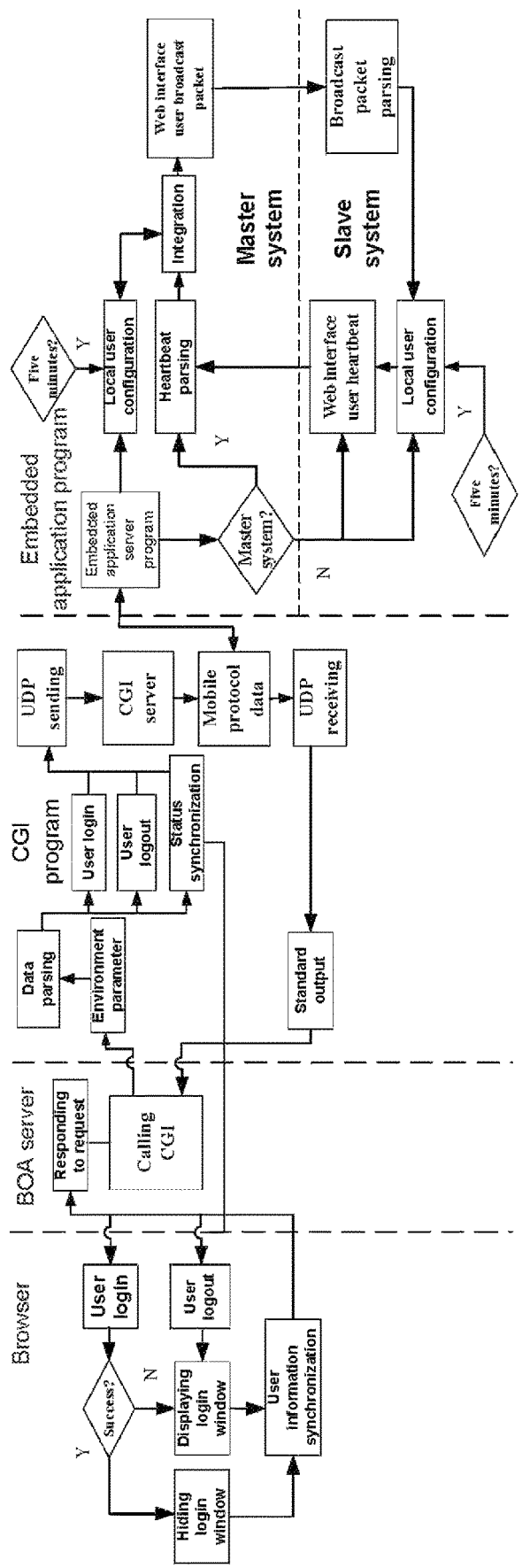
FIG. 7 is a flowchart of WEB synchronization of multiple systems according to an optional embodiment of present disclosure.

In an optional embodiment of the present disclosure, synchronization of login and logout information between the multiple systems is achieved through synchronizing the status information of the WEB user in the single system to an embedded application program and master-slave communication of the embedded application program of the system between the multiple systems, herein. And a synchronization process may include: synchronization of verification request of an account password inside the single system, a logout request, the login status to the embedded application program, reporting of the local login status based on a heartbeat of a slave system, integration of all system statuses and sending of UDP broadcast package by a host system, and modification of a local status by the slave system. As shown in FIG. 7, the following steps may be included.

At Step 1, the login and logout of the user are submitted.

At Step 101, a user calls the AJAX-GET method through the JavaScript program to request the CGI for a login or logout action when clicking login or logout after inputting the account password.

At Step 102, the CGI server program inquires the key book when logging in and returns a verification result or cleans the user password when logging out.

At Step 103, when the JavaScript program receives a response sign indicating a login failure or indicating the logout, the login window will be displayed; and when the verification is successful, the login window is closed.

At Step 2, the status of the WEB user is synchronized.

At Step 201, when logging in successfully or logging out, the JavaScript program calls the AJAX-GET method to request the CGI to set the login sign or a logout sign.

At Step 202, the CGI server program sends setting protocol data to the embedded application program.

At Step 203, the embedded application program updates a local login sign, a local logout sign and a login user name.

At Step 3, the embedded application program of the each system resets the logout sign as "Not logout" and resets the login sign as "Not login" upon starting.

At Step 4, the slave system reports to the host system according to a successful login or logout setting value of the WEB and the login user based on the heartbeat package.

At Step 5, the host system counts login and logout statuses and the users of all systems upon receiving the heartbeat package reported by the slave system.

At Step 6, a local system is set with an identical sign when polling to a login or logout sign of a specific slave system, and the sign is recorded as a status of the whole system.

At Step 7, the status and the user name of the whole system are broadcast to each slave system.

At Step 8, the each slave system extracts a relevant sign upon receiving the broadcast package to update the local login and logout statuses and the user.

At Step 9, the user of the WEB interface returns a status after synchronization when clicking to inquire the embedded application program.

At Step 10, the logout status is reset as "Not logout" after 15 seconds, as not to be in the login status, and a specific single system is synchronized as "Logout" when logging in.

At Step 11, the login sign is reset and the user name is cleaned after 5 min, and the user needs to log in again.

The traditional user management of the WEB interface is used in the single system. In case of the WEB interface of the multi-system DAS, individual login and logout and other operations need to be implemented for the each system. In this way, efficiency is low, and it is bad for management of the whole system. The beneficial effect of this embodiment of the present disclosure is as follows. The login and logout of the multiple systems may be achieved through the login and logout of the single system.

The unified management of the account information of the host system in the multiple systems is achieved through managing the slave with the broadcast package and downloading and updating the key book based on the FTP. A synchronization process may include: a host account management operation, broadcasting, by the host system, a CRC16 verification code of the key book by the host, comparing, by the slave system, the CRC16 verification code with a local verification code to determine whether to download a latest key book from the host system based on the FTP. The flowchart is shown in the figure, and may include the following steps.

Figure 8:
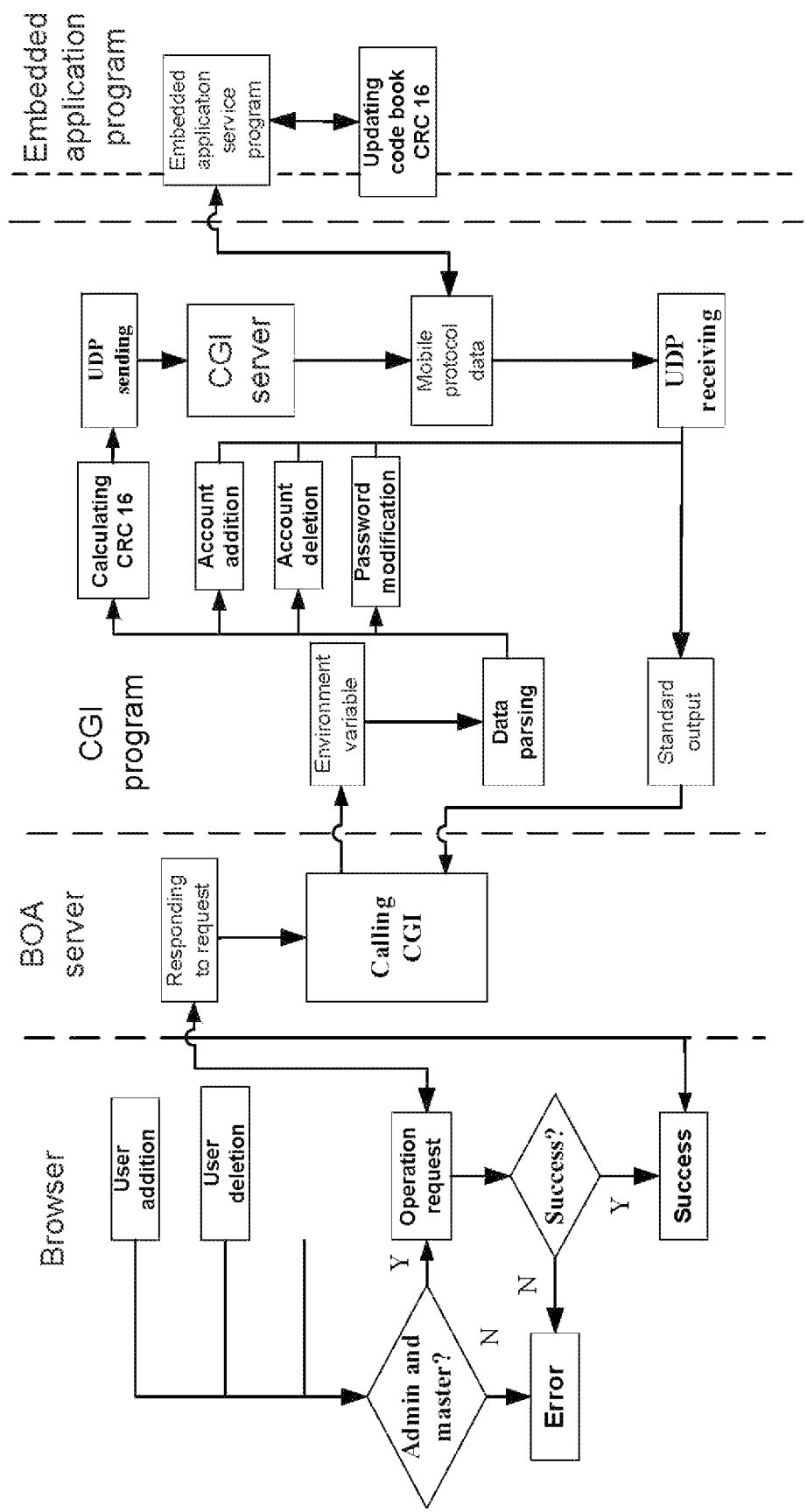
FIG. 8 is a flowchart of user management of a host system according to an optional embodiment of present disclosure.

At Step 1, the host system achieves account addition, account deletion and password modification in the account management in a unified way, as shown in FIG. 8.

At Step 101, the user calls the JavaScript program and a relevant API interface in response to operations of adding the user, deleting the user, modifying the password and the like by clicking the user management in the WEB interface.

At Step 102, whether the WEB interface of a system belongs to the host system is determined. When the WEB interface of the system does not belong to the host system, the user management operation is prohibited to be implemented, so as to achieve a purpose of unified management of the user information by the host system.

At Step 103, whether a current user logging in is an "admin" super-user is determined; when the current user logging in is not the "admin" super-user, the current user is prohibited to perform any operation, and a level of authority is differentiated.

At Step 103, the CGI is requested to implement the user management.

At Step 104, a CGI routine reads the key book of the account to implement addition, deletion, modification and other operations and requests the result.

At Step 105, the JavaScript program of the WEB interface receives a request reply indicating that the operation is successful, the CGI is requested again to synchronize with the embedded application program.

At Step 106, the CGI server program sends the protocol data to inform embedded software of updating CRC verification of a key book of a local account.

At Step 107, the embedded application program reads the key book of the account and calculates and stores the CRC16 verification.

At Step 2, the host system implements packaging for the CRC verification of the key book of the account to obtain a packaged result and broadcasts the packaged result to the each slave system based on the UDP.

Figure 9:
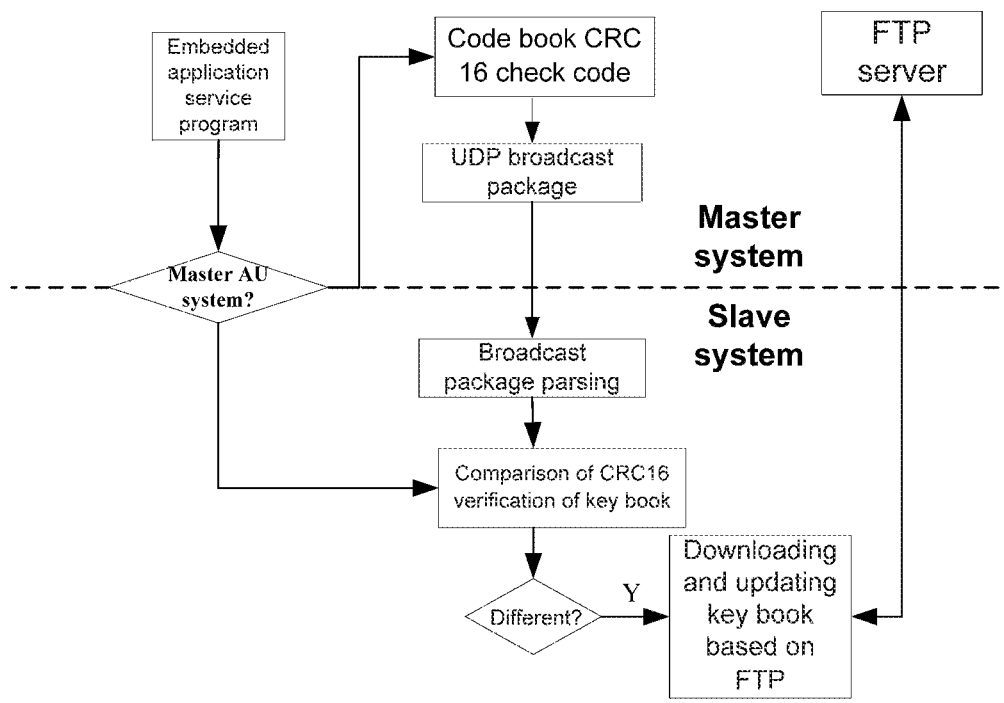
FIG. 9 is a flowchart of updating of a key book of a slave system according to an optional embodiment of present disclosure.

At Step 3, the each slave system updates the key book of the local account, as shown in FIG. 9.

At Step 301, the slave system compares the CRC verification of the key book of the account in the broadcast package with that stored locally, to obtain similarities and differences.

At Step 302, in case of the difference, the FTP is called to download the API interface, to download the latest key book of the account from the host system.

At Step 303, verification is implemented according to the latest key book of the account after logging in the WEB account of the each slave system.

The beneficial effects of this embodiment of the present disclosure are as follows. The host system may implement unified management of the user addition, user deletion, password modification of the multiple system. In this way the management is more unified and more explicit. In addition, downloading based on the FTP after comparison of the key book is newer, more concise, more accurate and more efficient when the CRC16 is calculated.

It should be understood that equivalent replacements or variations of the technical solution and inventive concept of the present disclosure by those skilled in the art should belong to the scope of protection of appended claims of the present disclosure.

What is claimed is:

1. A method of achieving synchronization management of account information of a World Wide Web (WEB) interface in a multi-system Distributed Antenna System (DAS), comprising: a security verification initialization of the WEB interface when a single system device in the multi-system DAS is started, a current user information synchronization of the WEB interface between systems in the multi-system DAS, and a key book synchronization of WEB account information between the systems in the multi-system DAS;

wherein the security verification initialization of the WEB interface when the single system device in the multi-system DAS is started comprises: submitting a password of an empty account by directly using an AJAX-GET method when the single system device is started to achieve a WEB webpage initialization, wherein a verification process comprises: a homepage code request, a login window code request, automatic verification of the password of the empty account, a control right of a login window and triggering of a clicking event;

wherein the current user information synchronization of the WEB interface between the systems in the multi-system DAS comprises: achieving synchronization of login and logout information between multiple systems through synchronizing status information of a WEB user in the single system to an embedded application program and master-slave communication of an embedded application program between the multiple systems, wherein a synchronization process of the login and logout information between multiple systems comprises: synchronization of a verification request of an account password in the single system, a logout request, a login status to a service program, reporting of a local login status based on a heartbeat of a slave system, integration of system statuses and sending of a User Datagram Protocol (UDP) broadcast package by a host system, and modification of a local status by the slave system;

wherein the key book synchronization of the WEB account between the systems in the multi-system DAS comprises: implementing unified management of the account information by using the host system in the multiple systems, managing the slave system with broadcast packages, and downloading and updating the key book based on a File Transfer Protocol (FTP), wherein a synchronization process of the key book comprises: a host account management operation, broadcasting, by the host system, a Cyclical Redundancy Check (CRC)16 verification code of the key book, and comparing, by the slave system, the CRC16 verification code with a local verification code to determine whether to download a latest key book from the host system based on the FTP;

wherein the homepage code request is used to request a homepage file, the login window code request is used to request a HTML file of a login window, the control right of a login window is used to control the display of a login window, the triggering of a clicking event is used to request the CGI to inquire the login sign and a system model.

2. The method of achieving synchronization management of account information on the WEB interface in the multi-system DAS as claimed in claim 1, wherein the security verification initialization of the WEB interface when the single system device in the multi-system DAS is started comprises the following steps:

initializing a homepage;
failing to implement automatic verification of a user login sign;
controlling the login window;
wherein initializing a homepage comprises the following steps:
requesting, by a browser, a homepage file when accessing to a WEB homepage;
responding, by a BOA server, to a corresponding request;
parsing, by the browser, the homepage file and a cited file of this homepage file, and a program display homepage;
calling, by a JavaScript program, an Asynchronous Javascript And XML (AJAX)-GET method to request a Common Gateway Interface (CGI) to verify the account password and relevant webpage file;
responding, by the BOA server, to call a CGI routine;
sending, by the CGI routine, protocol data to a CGI server program;
reading, by the CGI server program, an Extensive Markup Language (XML) file of the homepage and a Hypertext Markup Language (HTML) file of a login window;
verifying, by a CGI server, a password of a failed empty account;
returning, by the CGI server, the verified data to the CGI routine;
using, by the CGI routine, a standard output to return contents in response to a WEB request;
receiving, by the JavaScript program, the request, returning and parsing the webpage file;
wherein failing to implement automatic verification of a user login sign comprises the following steps:
failing, by the WEB program, to receive a verification return sign;
hiding the login window, and modifying a control sign;
handling over display and closing management of a logout window to the embedded application program for control;

wherein controlling the login window comprises the following steps:
requesting the CGI to inquire the login sign and a system model in case of any clicking event;
sending, by the CGI server program, query protocol data to the embedded application program;
returning, by the embedded software, a local record status;
when the JavaScript program receives a request response indicating that login has been implemented, not displaying the login window, when the JavaScript program receives the request response indicating that login has not been implemented, displaying the login window, prohibiting any other operation, and recording a master-slave system sign at the same time; and
setting a 5-second one-time clicking event to submit an AJAX-GET request, and repeating a query step by clicking again after 5 seconds.

3. The method of achieving synchronization management of account information on the WEB interface in the multi-system DAS as claimed in claim 1, wherein the current user information synchronization of the WEB interface between the systems in the multi-system DAS comprises the following steps:

submitting login and logout of a user;
synchronizing a status of the WEB user;
resetting, by the embedded application program of the each system, the logout sign as "Not logout" and resetting the login sign as "Not login" upon starting;
reporting, by the slave system, to the host system according to a successful login or logout setting value of the WEB and the login user based on a heartbeat package;
counting, by the host system, login and logout statuses and users of all systems upon receiving the heartbeat package reported by the slave system;
setting a local system with an identical sign when polling to the login or logout sign of a specific slave system, and recording the sign as a status of the whole system;
broadcasting the status and the user name of the whole system to each slave system;
extracting, by the each slave system, a relevant sign upon receiving the broadcast package to update the local login and logout statuses and the user;
returning, by the user of the WEB interface, a status after synchronization when clicking to inquire the embedded application program;
resetting the logout status as "Not logout" after 15 seconds, as not to be in the login status, and synchronizing a specific single system as "Logout" when logging in; and
resetting the login sign and cleaning the user name after 5 min, and logging in again;
wherein submitting login and logout of a user comprises the following steps:
calling the AJAX-GET method through the JavaScript program when the user clicks login or logout after inputting the account password, to request CGI for a login or logout action;
inquiring, by the CGI server program, an account key book when logging in and returning a verification result or cleaning the password of the user when logging out;
when the JavaScript program receives a response sign indicating a login failure or indicating the logout, displaying the login window; and when the verification is successful, closing the login window
wherein synchronizing a status of the WEB user comprises the following steps:

when logging in successfully or logging out, calling, by the JavaScript program, the AJAX-GET method to request the CGI to set a login sign or a logout skin;

sending, by the CGI server program, setting protocol data to the embedded application program;

updating, by the embedded application program, a local login sign, a local logout sign and a login user name.

4. The method of achieving synchronization management of account information on the WEB interface in the multi-system DAS as claimed in claim 1, wherein the key book synchronization of the WEB account between the systems in the multi-system DAS comprises the following steps:

achieving, by the host system, account addition, account deletion and password modification in the account management in a unified way;

implementing, by the host system, packaging for the CRC verification of the key book of the account to obtain a packaged result and broadcasting the packaged result to the each slave system based on the UDP;

updating, by the each slave system, the key book of the local account;

wherein achieving, by the host system, account addition, account deletion and password modification in the account management in a unified way comprises the following steps:

calling the JavaScript program and a relevant Application Programmers Interface (API) interface in response to operations of adding the user, deleting the user, modifying the password and the like by clicking the user management in the WEB interface;

determining whether the WEB interface of a system belongs to the host system; when the WEB interface of the system does not belong to the host system, prohibiting implementing the user management, so as to achieve a purpose of unified management of the user information by the host system;

determining whether a current user logging in is an "admin" super-user; when the current user logging in is not the "admin" super-user, prohibiting allowing any operation, and differentiating a level of authority;

requesting the CGI to implement the user management;

reading, by a CGI routine, the key book of the account to implement addition, deletion, modification and other operations and requesting a result;

when the JavaScript program of the WEB interface receives a request reply indicating that the operation is successful, requesting the CGI again to synchronize with the embedded application program;

sending, by the CGI server program, protocol data to inform embedded software of updating CRC verification of a key book of a local account;

reading, by the embedded application program, the key book of the account and calculating and storing the CRC16 verification;

wherein updating, by the each slave system, the key book of the local account comprises the following steps:

comparing, by the slave system, the CRC verification of the key book of the account in the broadcast package with the one stored locally storage, to obtain similarities and differences;

in case of the difference, calling the FTP to download the API interface, to download a latest key book of the account from the host system; and after logging in the WEB account of the each slave system, implementing verification according to the latest key book of the account.

\* \* \* \* \*